(12) United States Patent
Borghetti et al.

(10) Patent No.: US 10,360,129 B2
(45) Date of Patent: Jul. 23, 2019

(54) SETTING SOFTWARE ERROR SEVERITY RANKING

(71) Applicant: International Business Machines Corporation, Armonk, NY (US)

(72) Inventors: Stefano Borghetti, Rome (IT); Gianluca Della Corte, Rome (IT); Leonida Gianfagna, Rome (IT); Antonio M. Sgro', Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 14/930,974

(22) Filed: Nov. 3, 2015

(65) Prior Publication Data

US 2017/0124084 A1 May 4, 2017

(51) Int. Cl.
*G06F 16/00* (2019.01)
*G06F 11/34* (2006.01)
*G06F 11/30* (2006.01)
*G06F 16/2457* (2019.01)

(52) U.S. Cl.
CPC ........ *G06F 11/3495* (2013.01); *G06F 11/302* (2013.01); *G06F 16/24578* (2019.01)

(58) Field of Classification Search
CPC ............... G06F 11/2294; G06F 11/302; G06F 11/3495; G06F 8/71; G06F 11/3616; G06F 11/36; G06F 11/3664; G06F 11/3668; G06F 16/24578
See application file for complete search history.

(56) References Cited

U.S. PATENT DOCUMENTS

| 7,487,406 B2 * | 2/2009 | Kobrosly | G06F 11/079 714/26 |
| 7,917,897 B2 * | 3/2011 | Bassin | G06F 11/3604 717/126 |
| 8,584,092 B2 | 11/2013 | Yawalkar et al. | |
| 8,949,814 B2 | 2/2015 | Green et al. | |

(Continued)

OTHER PUBLICATIONS

Tomar et al., "Identifying Network Operation Impacting Bugs", An IP.com Prior Art Database Technical Disclosure, IP.com No. 000216758, IP.com Electronic Publication: Apr. 17, 2012, Copyright 2012 Cisco Systems, Inc., pp. 1-5.

*Primary Examiner* — Merilyn P Nguyen
(74) *Attorney, Agent, or Firm* — Edward J. Wixted, III

(57) ABSTRACT

Embodiments of the present invention provide systems, methods, and program products for automatic ranking of a technical software defect of a software service. Embodiments of the present invention can be used to collect technical environment parameters of a software service responsive to receiving a message associated with a technical software defect of the software service and determine a severity ranking value of the technical software defect based on a combined rating of the collected technical environment parameters wherein the technical environment parameters comprise at least a usage rate of the software service; a percentage of a number of users of the software-as-a-service environment authorized for using the software program; a log pattern of a signature of the technical software defect; and a percentage of a total functionality number of the software program, wherein the percentage defines a defect impact value.

20 Claims, 6 Drawing Sheets

(56) References Cited

U.S. PATENT DOCUMENTS

| | | | |
|---|---|---|---|
| 9,009,538 B2* | 4/2015 | D'Alterio | G06F 11/3684 |
| | | | 714/38.1 |
| 9,064,223 B2* | 6/2015 | Sinha | G06F 8/10 |
| 9,262,851 B2* | 2/2016 | Sridharan | G06F 8/34 |
| 9,274,874 B1* | 3/2016 | Chamness | G06F 11/0709 |
| 9,529,701 B2* | 12/2016 | Ekambaram | G06F 11/3664 |
| 9,720,685 B2* | 8/2017 | Novak | G06Q 10/101 |
| 2005/0076276 A1* | 4/2005 | Rivera | G06F 11/008 |
| | | | 714/724 |
| 2007/0168994 A1* | 7/2007 | Barsness | G06F 11/362 |
| | | | 717/129 |
| 2008/0046484 A1* | 2/2008 | Ellis | G06Q 10/063 |
| 2009/0210857 A1* | 8/2009 | Martineau | G06F 8/35 |
| | | | 717/120 |
| 2010/0251027 A1* | 9/2010 | Yawalkar | G06F 11/3616 |
| | | | 714/38.14 |
| 2011/0161933 A1* | 6/2011 | Hudson | G06F 11/0769 |
| | | | 717/125 |
| 2011/0258609 A1* | 10/2011 | Maczuba | G06F 11/0778 |
| | | | 717/128 |
| 2014/0201573 A1* | 7/2014 | Huang | G06F 11/362 |
| | | | 714/38.1 |
| 2015/0019564 A1 | 1/2015 | Higginson et al. | |

* cited by examiner

SETTING SOFTWARE ERROR SEVERITY RANKING

BACKGROUND

The invention relates generally to a severity ranking, and more specifically, to a method executed on a computer system for an automatic ranking of a technical software defect of a software service being executed in a software-as-a-service environment. The invention relates further to a related severity ranking system, and a computer program product.

Cloud computing and SaaS (software-as-a-service) deeply changed software consumption, software development, and in particular support processes. This is due to the fact that in a SaaS model the software applications are hosted by a service provider and/or a vendor and may not be deployed on customer's premises. This specific delivery model may be considered as an enabler for a different approach to software development and support of users. During normal development and test cycles, defects of the software are ranked by severity and the severity value is assigned based on the "perceived" impact estimated by the person being the tester.

Generally, the tester has just a generic idea about the business field of operation of a customer and thus, the severity value is not mapped through a quantitative approach to the real impacts that the defect may have on a customer's environment that is already in place.

SaaS delivery paradigms change the operating background because customers' environments are hosted by a service provider and/or software vendor which has direct and continuous access to all the clients' installations. Consequently, the service provider has access to log files and usage patterns and error situations of all users of a customer.

SUMMARY

Embodiments of the present invention provide systems, methods, and program products for automatic ranking of a technical software defect of a software service. In one embodiment of the present invention a method is provided comprising: responsive to receiving a message associated with a technical software defect of a software service, wherein the software service is executed on a server in a software-as-a-service environment, collecting technical environment parameters of the software service; and determining a severity ranking value of the technical software defect based on a combined rating of the collected technical environment parameters, wherein the technical environment parameters comprise at least a usage rate of the software service; a percentage of a number of users of the software-as-a-service environment authorized for using the software program; a log pattern of a signature of the technical software defect; and a percentage of a total functionality number of the software program, wherein the percentage defines a defect impact value.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
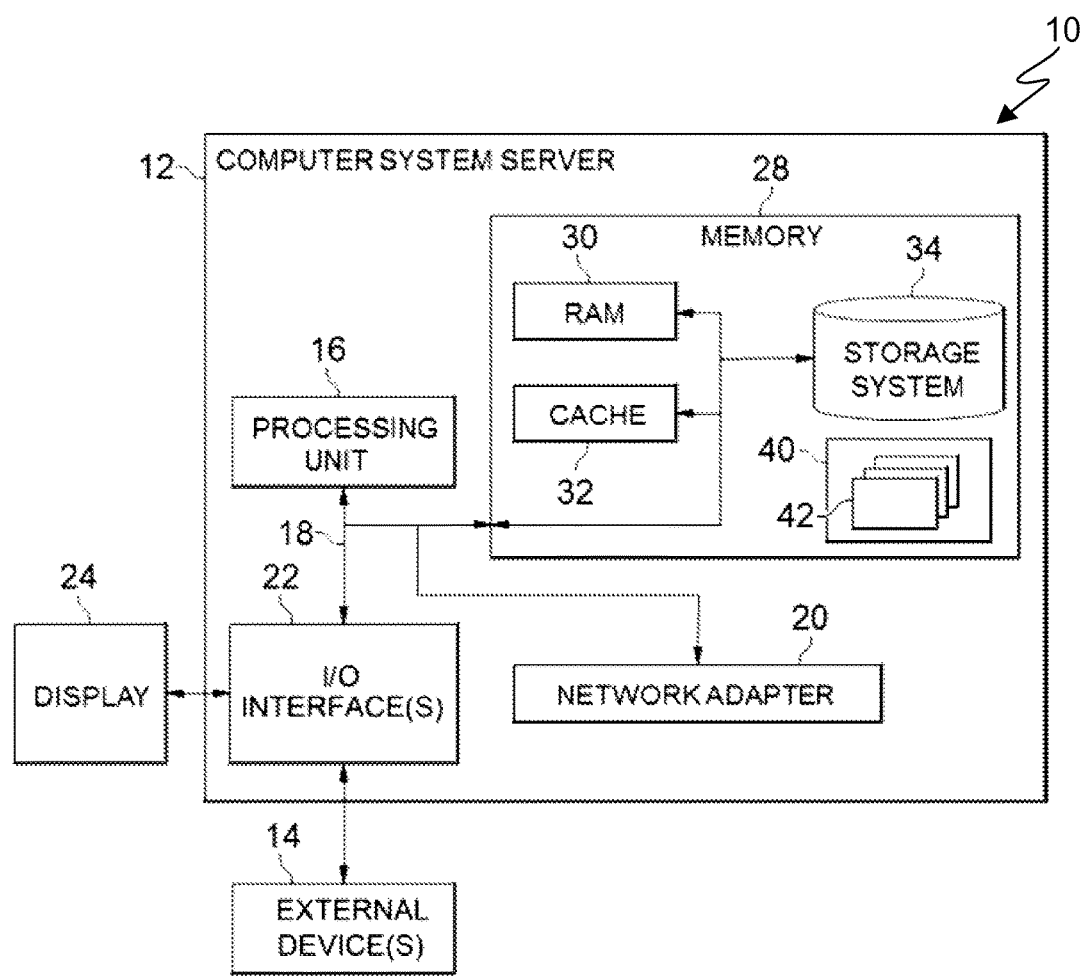
Figure 2:
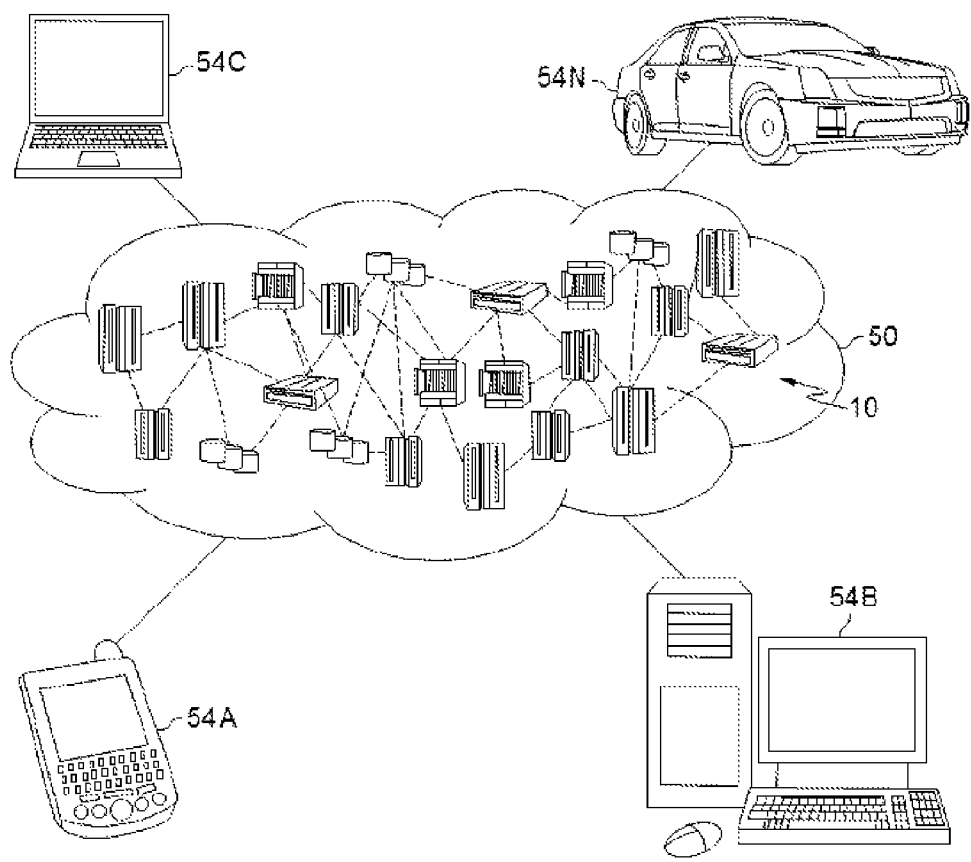
Figure 3:
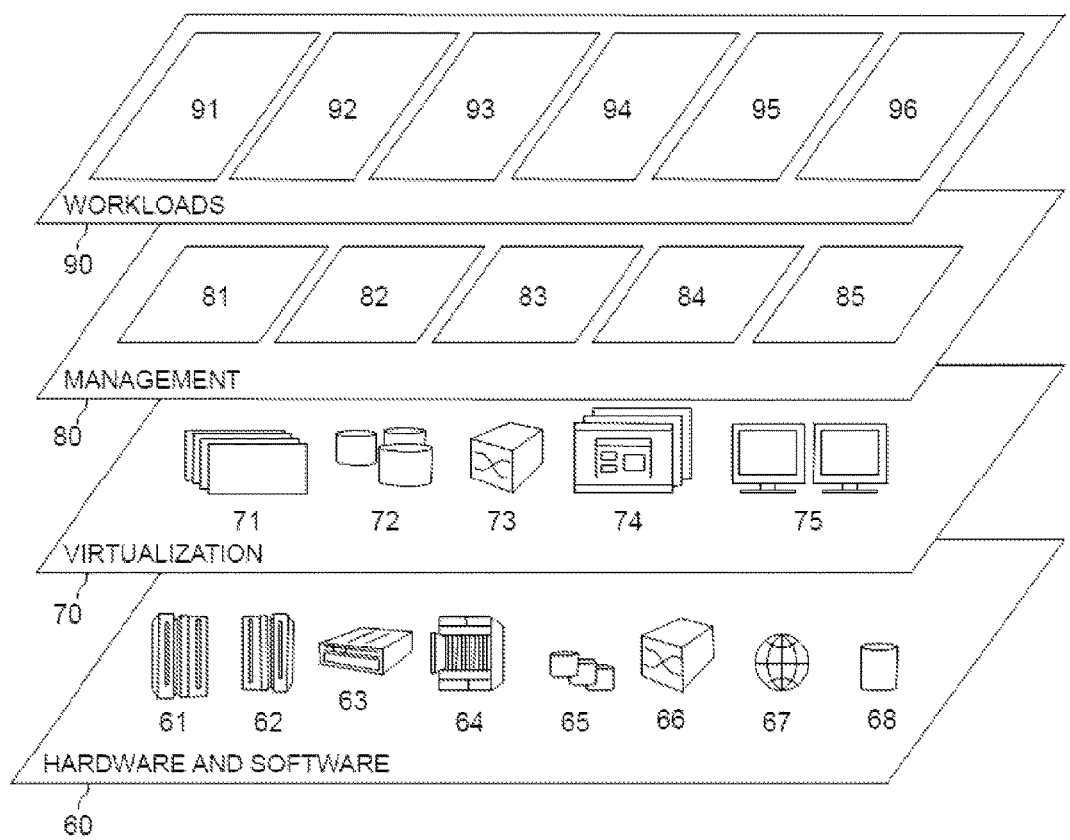
Figure 4:
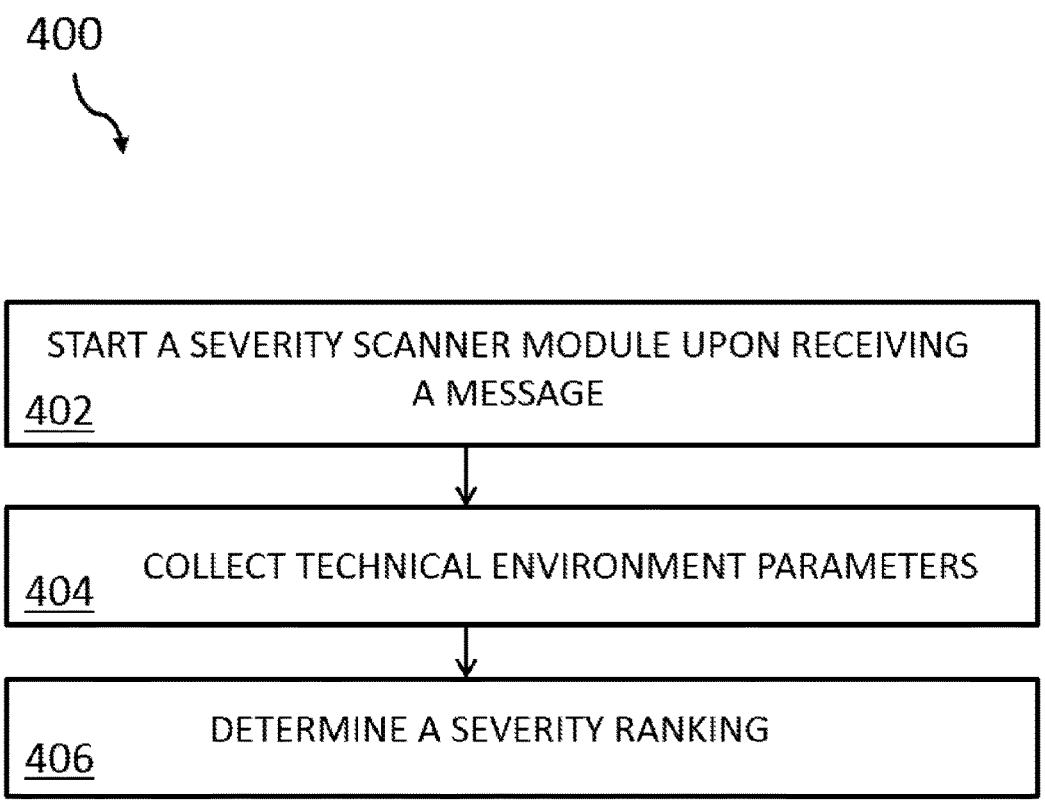
Figure 5:
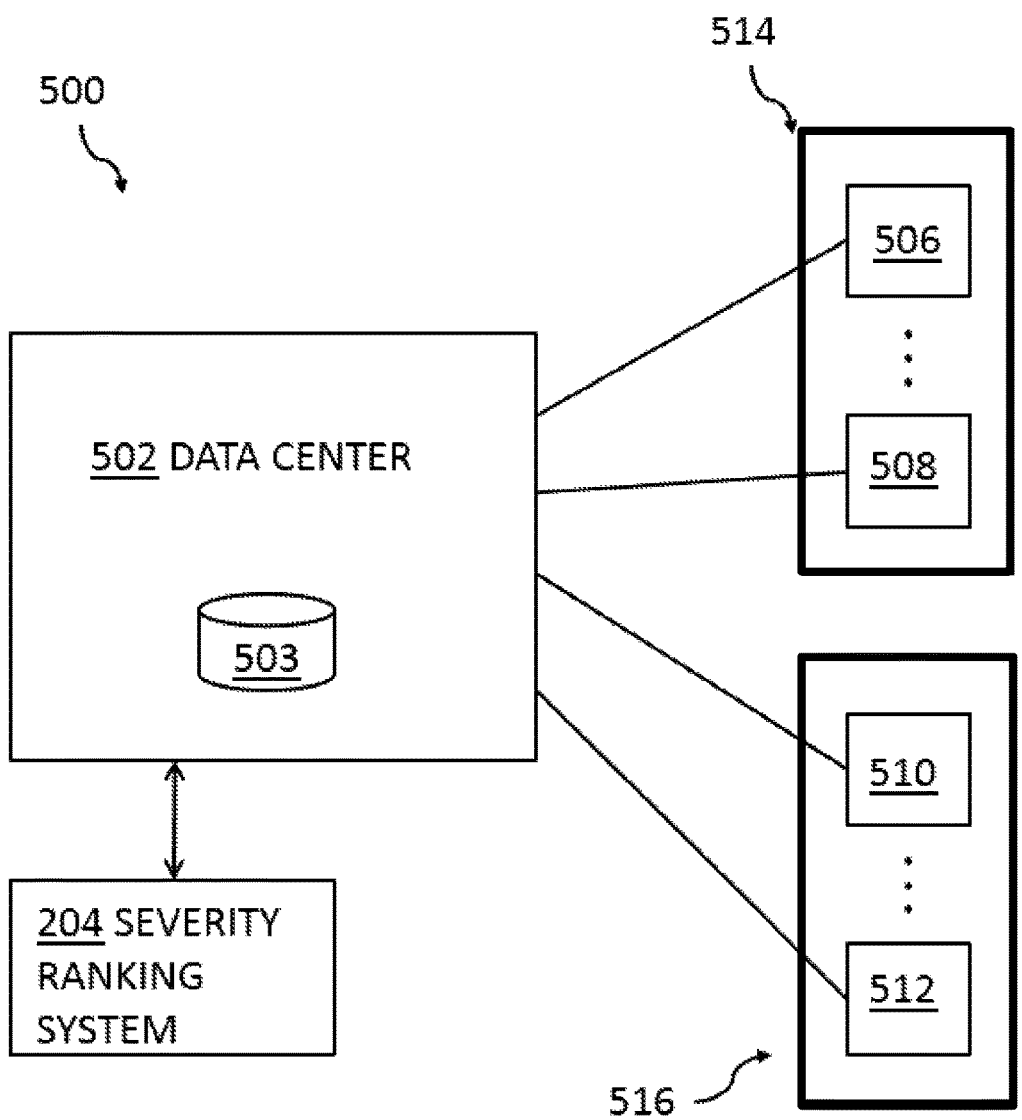
Figure 6:
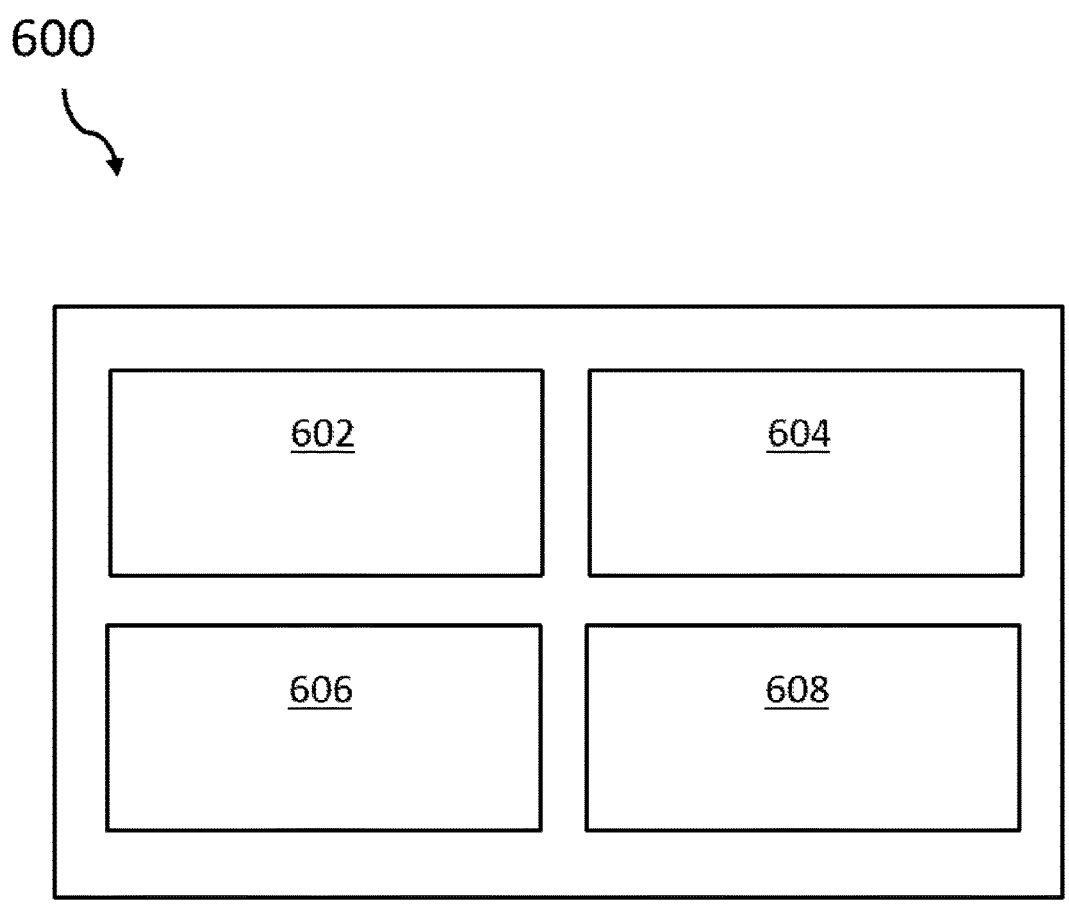

Embodiments of the invention will be described, by way of example only, and with reference to the following drawings:

FIG. 1 is a block diagram of an electronic device suitable for implementing embodiments of the present invention;

FIG. 2 is a block diagram of a cloud computing environment, in accordance with embodiments of the present invention;

FIG. 3 is a block diagram of abstraction model layers, in accordance with embodiments of the present invention;

FIG. 4 shows a flowchart for an automatic ranking of a technical software defect, in accordance with embodiments of the present invention;

FIG. 5. shows a block diagram of the relationship of the severity ranking system with components of the environment SaaS, in accordance with an embodiment of the present invention; and FIG. 6 shows a severity ranking system for an automatic ranking of a technical software defect of a software service being executed in a software-as-a-service environment, in accordance with embodiments of the present invention.

DETAILED DESCRIPTION

In the context of this description, the following conventions, terms and/or expressions may be used:

The term "technical software defect" may denote a malfunction or non-function of software code. The software program or module may not work as designed, may crash the application, may generate wrong results or may have any other behavior that is seen as not working to expectation or specification.

The term "software service" may denote a software program or a part thereof written under the service oriented architecture paradigm. A software service may already be a complete software application program. Alternatively, a software application program may require a plurality of software services that are interrelated by message exchanges. More details about service orientation and cloud computing is detailed below.

The term "software-as-a-service environment" may denote a computing environment optimized for a software-as-a-service delivery model or cloud SaaS as detailed below.

The term "software application program" may denote a complete set of functionalities provided by an application program. Different functions of the program may be provided by different software services. The software services may be interrelated by message exchanges.

The term "severity scanner module" may denote a unit which may be either implemented in software or in hardware or in a combination of both. The severity scanner module may interact with system management tools enabled for supervising a plurality of data center devices like servers, networking equipment, storage systems, hypervisors, direct or virtual operating systems, and so on. The severity scanner module may be enabled to exchange messages and other information with the system management tools. Thus, the severity scanner module may collect—from the system management tools—technical parameters, which may, e.g., be stored in log files and other supervising data collections indicative of the operation of the active and passive elements of the cloud computing center.

The term "technical environment parameters" may denote information about the runtime environment of a data center. Alternatively, also technical environment parameters of test data centers may be taken into account. A large plurality of technical environment parameters may be collected and stored by the system management tools. System health data as well as volume data, usage data and so on may be stored in log files. The same may apply to a tracking of errors and related defect signatures which may be generated when a defect in a hardware or software system—e.g., a software application program or a software service—occurs.

The term "severity ranking" or severity ranking value may denote an importance factor for a defect of a software service. Traditionally, a human supervisor, operator or, test manager may have assigned a severity code to a defect in a software module. Often, four different codes may have been assigned to software defects. The human supervisor has to use his experience to assign a reasonable severity value to a software defect. However, if a massive avalanche of defects happens at the same time, the human supervisor may be overwhelmed with his severity code assignments. Basically, the severity ranking assigns a higher severity value to those software defects having the largest impact on a computing environment of a group of users—e.g., of one company—in a cloud computing or SaaS environment.

The term "total functionality number" may denote the sum of all functions of a software program. Each interaction with a user may—for example—be counted as one function or, individual process steps or calculation steps may be counted as one functionality. A dedicated metric for the total functionality number may depend on the individual application software program.

The proposed method and related system may be implemented in a cloud computing environment. In the following, typical characteristics of cloud computing environments are detailed:

In the following, a detailed description of the figures will be given. All instructions in the figures are schematic. Firstly, an electronic device suitable for implementing embodiments of the present invention is discussed. The following two block diagrams discuss a cloud computing environment and abstraction model layers, in accordance with embodiments of the present invention. Then, a block diagram of an embodiment of the inventive method for an automatic ranking of a technical software defect of a software service being executed in a software-as-a-service environment is given. Afterwards, further embodiments as well as embodiments of the severity ranking system will be described.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Additionally, the severity ranking system discussed in greater detail in FIG. 6 may be attached to the bus 18.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96. Some example embodiments of the present invention will be described in the following paragraphs. As described above, when retrieving data from cloud, for example, after a disaster at the data center, it is desired that the data can be retrieved and recovered/reconstructed within a specified time limit. However, the cloud is relatively slow. The input/output (I/O) latency from cloud storage is now large. Moreover, a cloud storage device is usually shared by multiple clients that are connected to the cloud via network such as the Internet Protocol (IP) network. As a result, the I/O performance of the cloud storage devices is unstable and unpredictable. Additionally, in conventional data recovery, the data is always read sequentially from a primary cloud device. Redundancy data will not read until a drive/cloud fails.

In order to improve the efficiency of the data retrieval from cloud, embodiments of the present invention allow concurrent retrieval from multiple cloud storage devices. Instead of waiting for a failure in retrieval of the primary data, redundant data will be read concurrently. In this way, it is possible to initiate the data construction before all the data stripes arrive.

It may be noted that cloud software takes full advantage of the cloud paradigm by being service-oriented with a focus on statelessness, low coupling, modularity, and semantic interoperability.

The proposed method executed on a computer system for an automatic ranking of a technical software defect of a software service being executed in a software-as-a-service environment may offer couple of advantages and technical effects:

The subjective assessment of the person being the tester or test manager or support manager may be replaced by an automatic, machine-based determination of an impact of a software defect—also known as a "software bug"—of a function of a software program in a test environment or in a production environment. Because the proposed method reflects that software programs may be designed based on a plurality of different orchestrated software services, the support of a service provider and/or software vendor may be enhanced. The automatic severity ranking may be much faster than a manual process in which a test manager may be involved. Especially, in cases, in which a flood of error messages comes up, a test manager or support manager may be overwhelmed by the number of incoming error messages. Thus, he may make wrong severity rankings, which may lead to a situation, in which not those errors may be addressed and repaired according to that direct impact on user or customer environments. The automatic severity ranking addresses this problem directly by an automatic, objective, number and fact based severity ranking, which is free of an assessment based on individual estimates and assumptions. Thus, the support quality in a SaaS data center may be enhanced so that user and customer satisfaction may be increased.

FIG. 4 shows a flowchart 400 for an automatic ranking of a technical software defect, in accordance with embodiments of the present invention. In this embodiment, operational steps may be executed on a computer system. For example, embodiments of the present invention can provide solutions for automatic ranking of a technical software defect known as a software bug of a software service being executed as a software-as-a-service environment. Generally speaking, a complete software application program may include a plurality of software services (e.g., according to programming paradigms of the service oriented architecture (SOA)).

In step 402, responsive to receiving a message about the technical software defect regarding the software service being executed on a server in the software-as-a-service environment, a severity scanner module is started.

In step 404, the severity scanner module collects technical environment parameters of the software service. In this embodiment, the technical environments parameters may comprise: application program versions and releases, the same for operating systems, hypervisor's, and other middleware (e.g., databases and messaging versus the hardware platform) used, network equipment used, messaging protocol applied, log files, and so on. The technical environment parameters may be collected from an information pool managed by the systems management tools supervising and administering the cloud computing center.

In step 406, a severity ranking of the technical software defect based on a combined rating of the collected technical environment parameters and their values, respectively, is determined. In this embodiment, the technical environment parameters comprise at least a usage rate of the software service (i.e., how often is the software service comprising the technical software defect typically used on average). Moreover, the technical environment parameters may also comprise a percentage values of a number of users of the software-as-a-service environment authorized for using the software program. This may also include information about the relationship of a user to a specific customer. In some instances, the software application program relying on the software service is, to a large extent, used only by one customer (with many users). Where the software application program relying on the software service is, to a large extent, used only by one customer with many users, the severity ranking has a reduced severity ranking value because it may only be relevant for one out of a plurality of customers.

Additionally, the technical environment parameters may comprise a log pattern of a signature of the technical software defect. Such a signature may typically be logged in log files of system management tools supervising the data center—in this case, the SaaS data center including hardware and software of the servers running the software service.

Furthermore, the technical environment parameters may comprise a percentage of a total functionality number of the software program. The application software program may be subdivided into functions to be performed. For example, the number of functions is 100. The software service in question may be required by 5 of those functions. In this case, the percentage value is 5%.

According to one advantageous embodiment of the flowchart 400, (e.g., step 406) the determining of the severity ranking may be based on the following formula:

$$\text{severity ranking value} = \text{function}(ei*E, fi*F, li*L, di*D) \quad \text{Formula 1:}$$

wherein E=technical environment parameters, F=the usage rate, L=the log pattern of the signature, D=the defect impact value, and ei, fi, li, di are function specific weight factors. The weight factors may be used for a calibration of the resulting severity ranking value to a specific cloud computing or software-as-a-service environment.

One more specific example may clarify the severity ranking formula: as one example of the formula, the following may be assumed $$\text{severity ranking value} = (E+F+L+D)/4. \quad \text{Formula 2:}$$

The severity ranking value is then a percentage that varies between 0 and 1 (1 representing 100%). A 0% value may represent the lowest severity ranking value (severity 4) and a 100% value may represent the maximum severity ranking value (severity 1). The percentage values may be split into four groups:

i. 0-0.25 representing severity ranking value 4;
   ii. 0.26-0.50 representing severity ranking value 3;
   iii. 0.51-0.75 representing severity ranking value 2; and
   iv. 0.76-1 representing severity ranking value 1.

This would mean—in this example—that ei=fi=li=di=1 and E, F, L, D may range from 0 to 1. However, in some computing environments, it may be helpful to change the weight values.

Now, the following values may be assumed:

E=0.27, representing a relative low severity parameter because in a specific customer environment only Linux systems may be affected by the technical software defect. Only 300 of a total of 1100 servers may be operated using Linux.

F=0.2, also representing a relative low severity parameter because no thread KPI (as known as performance indicator or metric) is used or defined. The thread KPI—relating to a number of available threads—may not be so important if compared to other potentially defined metrics for (e.g., networks) for memory or storage systems.

L=0.1; the severity scanner module may perform its scan on customer technical environment parameters and may discover that the log pattern="sscanf failed on /proc/sys/kernel/threads-max with 5 (failed to get may threads)" is present only in 10% of the Linux systems which means that only 30 systems are effective (compare above: 300 Linux systems in total).

D=0.1; also representing the relatively low severity parameter, i.e., low impact because it may be only one metric for Linux systems. This value may have been pre-defined by a developer when the new function or capability has been introduced.

As a consequence, the severity ranking value can be calculated as 0.67/4=0.17. This may represent a severity ranking value of 4 because the result is in the range between 0 and 0.25.

In this embodiment, a user (e.g., a human supervisor) may have set the severity ranking value to 2 based on his potentially misleading or biased experience. However, a neutral, machine-based, objective determination, which may reflect a plurality of different severity parameters, may result in a lower severity ranking value. This may allow a repair team to concentrate on the high severity code value defect situations first in order to optimize the operation of the software-as-a-service environment of the cloud computing center for all users.

According to one additionally advantageous embodiment of the method, the mentioned technical environment parameters may comprise at least one selected out of the group comprising a version number of the software service, a release number of the software service, a version number of the software program, an operating system, and a middleware system. Typically, a middleware system comprises at least a database, an EAI bus (enterprise application integration), networking equipment, storage systems, hardware platforms, etc. Basically, all technical environment parameters may be instrumental to describe a software-as-a-service environment may be counted as technical environment parameters.

According to one embodiment of the method discussed in relation to flowchart 400, the log pattern of the signature may be received by the severity scanner module from a systems management tool adapted for administering the software-as-a-service environment. Thus, the severity scanner module may have access to all actually available historical operational parameters of the data center, in particular the software-as-a-service environment.

According to one optional embodiment of the method discussed in relation to flowchart 400, the technical environment parameters also comprise data about how many different groups of users access the software program. This may have the effect that a software defect impact may be set into a relationship to the number of different companies that may be affected by the defect. This may be possible if a group of users is related to one dedicated customer company of the software-as-a-service offering. It may also happen that the content of the technical environment parameters may render it obvious that only one customer company may be affected. In that case, the severity ranking may be lower compared to a case in which every customer company may be affected by the software defect. The same principle may be applied to subgroups in one of the user groups. The subgroups may relate to a department of a customer being a user of the SaaS offering.

In one additional embodiment, the method discussed in relation to flowchart 400 may comprise comparing a signature of the technical software defect within one set of user specific log data with other sets of user specific log data. This way, it may be determined whether the same defect—namely, the defect having the same signature of the technical software defect—may have happened to other users of the SaaS environment. The more users that may be affected, the higher the severity ranking value may be set.

According to one optional embodiment of the method discussed in relation to flowchart 400, comparing a signature may further comprise determining an average likelihood of one set of user specific data to be affected by the software defect (i.e., to face said technical software defect). This may reveal information such as how many other users may potentially be affected by a software service defect. The software service defect may just not have happened to one of the other users because the other users may not have used the specific defect service of a larger software application program. However, the defect may happen sooner or later also to the other users. Such a situation would also lead to an increase of the severity ranking value of a specific defect.

According to one additional embodiment of the method discussed in relation to flowchart 400, the determining an average likelihood may further comprise determining an average likelihood of groups of users to face the technical software defect. In this case, the above discussed potential affection of another user may also be applied to a group of users. Thus, as part of this determination, the number of customers potentially affected by the software defect, may be determined.

In one optional embodiment of the method discussed in relation to flowchart 400, the software service may be available from different operating system environments. Thus, also a relationship between the software defect and the underlying operating environment (e.g., Solaris, AIX/Power, x86/Windows, x86/Linux, z OS, etc.) may be determined. If a software defect may only happen in a Solaris environment, and if the number of users using the software service on the Solaris environment is relatively low, also the severity ranking value may be set to a relative low value.

FIG. 5. shows a block diagram 500 of the relationship of the severity ranking system with components of the SaaS environment, in accordance with an embodiment of the present invention.

A plurality of user systems 506, 508, 510, 512 may access a cloud data center 502, on which server software application programs may be executed on a plurality of servers. The software application programs may be accessed by the user systems 506, . . . , 512 by web browsers or other user interfaces. The user systems 506-508 may represent a plurality of user systems belonging to one user group 514, (e.g., related to one company), which may be a customer to the cloud data center 502. The software application programs may be accessed in a software-as-a-service mode, as explained above. The data center may be managed by systems management tools (not shown), which may collect and store technical environment parameters 503 about the operation of the data center environment including information about servers, operating system, networks, storage systems, middleware systems, and so on. The software application programs may be composed of a plurality of software services also being executed on the servers of the cloud data center 502.

In case a technical software defect of a software service may happen, it may be logged in the technical environment parameters 503. The severity ranking system 504 may collect these technical environment parameters 503 from the storage system or storage systems of the cloud data center 502. The severity ranking system 504 may—based on the received technical environment parameters 503—determine a severity ranking value for the technical software defect. This may reflect relationship to one or more user systems 506, 508, 510, 512 or to one or more user groups 514, 516 (i.e., customers).

FIG. 6 shows a severity ranking system for an automatic ranking of a technical software defect of a software service being executed in a software-as-a-service environment, in accordance with embodiments of the present invention. Also shown here is a software application program. The software application program may include a plurality of software services. The severity ranking system 600 comprises a severity scanner module 602 adapted for receiving a message about the technical software defect regarding the software service being executed on a server in said software-as-a-service environment. The severity scanner module 602 comprises a collection unit 604 adapted for collecting technical environment parameters of said software service, and a determination unit 606 adapted for determining a severity ranking of said technical software defect based on a combined rating of said collected technical environment parameters, wherein said technical environment parameters comprise at least a usage rate of said software service, a percentage of a number of users of said software-as-a-service environment, authorized for using said software program, log pattern of a signature of said technical software defect, and a percentage of a total functionality number of said software program, wherein the percentage defines a defect impact value.

The severity ranking system 600 may also comprise a calculation engine 608.

According to one aspect of the present invention, a method—executed on a computer system—for an automatic ranking of a technical software defect of a software service may be provided. The software service may be part of a larger software application program which may be executed in a software-as-a-service environment on a server in a data center. The software application program may be composed of a plurality of software services. The method may comprise, upon receiving a message about the technical software defect regarding the software service being executed on a server in the software-as-a-service environment, starting a severity scanner module, and collecting technical environment parameters of the software service by the severity scanner module.

Furthermore, the method may comprise determining a severity ranking value of the technical software defect based on a combined rating of the collected technical environment parameters. The technical environment parameters may comprise at least a usage rate of the software service, a percentage of a number of users of the software-as-a-service environment authorized for using the software program, a log pattern of a signature of the technical software defect, and a percentage of a total functionality number of the software program. The percentage value may define a defect impact value.

According to another aspect of the present invention, a related severity ranking system may be provided.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

Embodiments of the invention may be implemented together with virtually any type of computer, regardless of the platform being suitable for storing and/or executing program code. For example, embodiments of the present invention may be implemented by computer systems, as shown in described in FIG. 1. Special functions—e.g., the severity ranking system—may be performed by dedicated hardware implementations.

The computing systems of FIG. 1 are only one example of a suitable computer system and is not intended to suggest any limitation as to the scope of use or functionality of embodiments of the invention described herein. Regardless, computing systems of FIG. 1 are capable of being implemented and/or performing any of the functionality set forth hereinabove. In the computer systems, there are components, which are operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 12 may be described in the general context of computer system-executable instructions, such as program modules, being executed by a computer system/server 12. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method comprising:
   responsive to receiving a message associated with a technical software defect of a software service, wherein the software service is executed on a server in a software-as-a-service environment, collecting technical environment parameters of the software service by a severity scanner module;
   determining a severity ranking value of the technical software defect based on a combined rating of the collected technical environment parameters, wherein:
   the determined severity ranking value reflects whether one or a plurality of users are affected by the technical software defect and is applied to improve the efficiency of the software-as-a-service environment; and
   the technical environment parameters comprise:
   a usage rate of the software service;
   a percentage of a number of users of the software-as-a-service environment authorized for using a software program;
   a log pattern of a signature of the technical software defect; and
   a percentage of a total functionality number of the software program, wherein the percentage defines a defect impact value; and
   automatically ranking the technical software defect based on the determined severity ranking value.

2. The method of claim 1, wherein the technical environment parameters are selected from the group consisting of:

a version number of the software service, a release number of the software service, a version number of the software program, an operating system, and a middleware system.

3. The method of claim 1, wherein the log pattern of the signature is received by the severity scanner module from a systems management tool adapted for administering the software-as-a-service environment.

4. The method of claim 1, wherein the technical environment parameters further comprise data pertaining to how many different groups of users access the software program.

5. The method of claim 1, further comprising comparing a signature of the technical software defect within one set of user specific log data with one or more signatures of technical software defects within other sets of user specific log data.

6. The method of claim 5, further comprising:
determining an average likelihood of one set of user specific data to face the technical software defect.

7. The method of claim 6, further comprising:
determining an average likelihood of groups of users to face the technical software defect.

8. The method of claim 1, wherein the software service is available from different operating system environments.

9. A computer program product comprising:
one or more computer readable storage media and program instructions stored on the one or more computer readable storage media, the program instructions comprising:
program instructions to, responsive to receiving a message associated with a technical software defect of a software service, wherein the software service is executed on a server in a software-as-a-service environment, collect technical environment parameters of the software service by a severity scanner module;
program instructions to determine a severity ranking value of the technical software defect based on a combined rating of the collected technical environment parameters, wherein:
the severity ranking value reflects whether one or a plurality of users are affected by the technical software defect and is applied to improve the efficiency of the software-as-a-service environment; and
the technical environment parameters comprise:
a usage rate of the software service;
a percentage of a number of users of the software-as-a-service environment authorized for using a software program;
a log pattern of a signature of the technical software defect; and
a percentage of a total functionality number of the software program, wherein the percentage defines a defect impact value; and
program instructions to automatically rank the technical software defect based on the determined severity ranking value.

10. The computer program product of claim 9, wherein the technical environment parameters are selected from the group consisting of: a version number of the software service, a release number of the software service, a version number of the software program, an operating system, and a middleware system.

11. The computer program product of claim 9, wherein the log pattern of the signature is received by the severity scanner module from a systems management tool adapted for administering the software-as-a-service environment.

12. The computer program product of claim 9, wherein the technical environment parameters also comprise data about how many different groups of users access the software program.

13. The computer program product of claim 9, wherein the program instructions stored on the one or more computer readable storage media further comprise:
program instructions to compare a signature of the technical software defect within one set of user specific log data with one or more signatures of technical software defects within other sets of user specific log data.

14. The computer program product of claim 13, wherein the program instructions stored on the one or more computer readable storage media further comprise:
program instructions to determine an average likelihood of one set of user specific data to face the technical software defect.

15. A computer system comprising:
one or more computer processors;
one or more computer readable storage media; and program instructions stored on the one or more computer readable storage media for execution by at least one of the one or more computer processors, the program instructions comprising:
program instructions to, responsive to receiving a message associated with a technical software defect of a software service, wherein the software service is executed on a server in a software-as-a-service environment, collect technical environment parameters of the software service by a severity scanner module;
program instructions to determine a severity ranking value of the technical software defect based on a combined rating of the collected technical environment parameters, wherein:
the severity ranking value reflects whether one or a plurality of users are affected by the technical software defect and is applied to improve the efficiency of the software-as-a-service environment; and
the technical environment parameters comprise:
a usage rate of the software service;
a percentage of a number of users of the software-as-a-service environment authorized for using a software program;
a log pattern of a signature of the technical software defect; and
a percentage of a total functionality number of the software program, wherein the percentage defines a defect impact value; and
program instructions to automatically rank the technical software defect based on the determined severity ranking value.

16. The computer system of claim 15, wherein the technical environment parameters are selected from the group consisting of: a version number of the software service, a release number of the software service, a version number of the software program, an operating system, and a middleware system.

17. The computer system of claim 15, wherein the log pattern of the signature is received by the severity scanner module from a systems management tool adapted for administering the software-as-a-service environment.

18. The computer system of claim 15, wherein the technical environment parameters also comprise data about how many different groups of users access the software program.

19. The computer system of claim 15, wherein the program instructions stored on the one or more computer readable storage media further comprise:

program instructions to compare a signature of the technical software defect within one set of user specific log data with one or more signatures of technical software defects within other sets of user specific log data.

20. The computer system of claim 19, wherein the program instructions stored on the one or more computer readable storage media further comprise:

program instructions to determine an average likelihood of one set of user specific data to face the technical software defect.

* * * * *